UNITED STATES PATENT OFFICE.

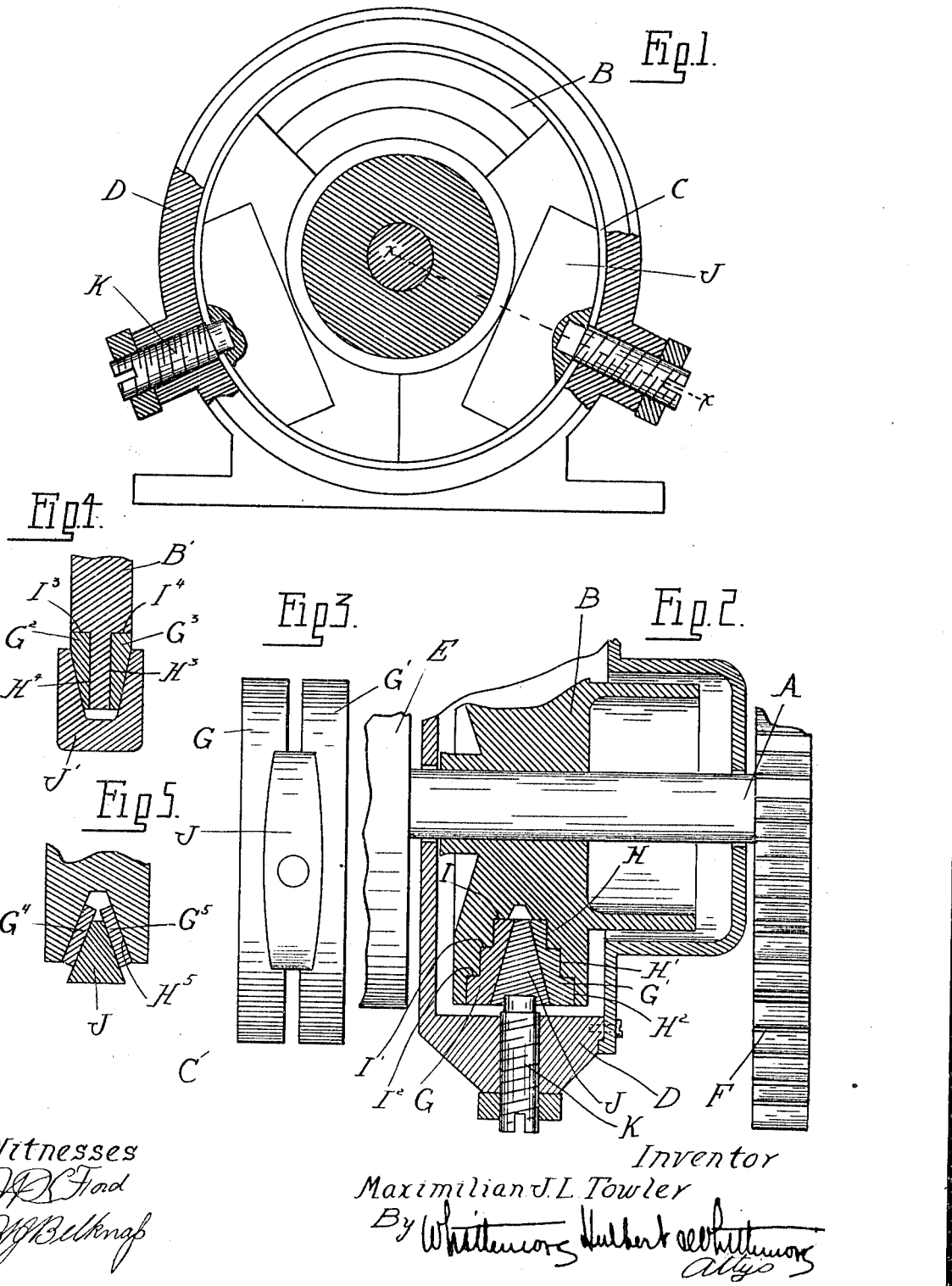

MAXIMILIAN J. L. TOWLER, OF DETROIT, MICHIGAN.

FRICTION DEVICE.

1,118,705. Specification of Letters Patent. Patented Nov. 24, 1914.

Application filed November 21, 1908. Serial No. 463,776.

*To all whom it may concern:*

Be it known that I, MAXIMILIAN J. L. TOWLER, a citizen of the United States of America, residing at Detroit, in the county of Wayne and State of Michigan, have invented certain new and useful Improvements in Friction Devices, of which the following is a specification, reference being had therein to the accompanying drawings.

The invention relates to that class of friction devices more particularly designed for use in connection with hoisting apparatus for the purpose of holding the load from accidental release, while permitting both the raising and lowering thereof.

The invention consists—first, in the peculiar construction of a friction shoe, and, further, in the construction and arrangement of the same, in relation to the holding apparatus, as more fully hereinafter set forth.

In the drawings Figure 1 is a sectional elevation of the apparatus; Fig. 2 is a section on line $x$—$x$, Fig. 1; Fig. 3 is an elevation of one of the shoes; Fig. 4 is a section similar to Fig. 2 illustrating a modified construction; and Fig. 5 is a similar view showing another modification.

In general construction the apparatus comprises a rotary member, such as the shaft A, on which is mounted a rotary friction member B engaging friction shoes C in a supporting bearing D. The member B forms in effect a journal for the shaft A and the shoes C a bearing for said journal which, when the shaft is driven by a force reacting on the shoes within the limiting angle of friction, will operate as a lock. On the other hand, if the driving force reacts upon the shoes without the angle of friction, rotation of the shaft and member B is permitted. Where the device is employed for a hoisting drum, such as E, mounted on the shaft A, it is so organized that the load reacting tangentially upon the drum, and through the latter upon the shoes C, will be within the angle of friction, while the driving member, such as the gear wheel F of larger diameter than the drum E, will react upon the shoe outside of the angle of friction.

It is desirable to reduce the size of the journal B, and to this end, in certain constructions heretofore used, wedge-shaped friction shoes have been employed. These permit of materially reducing the diameter of the member B while still maintaining the reactive force from the drum upon the shoe within the angle of friction, but in practice it has been found that such shoes lose their efficiency. This is due to the fact that the contacting surfaces of the shoe and the rotary member B will be frictionally worn so as to lose their original shape, the effect being to form a series of minute annular grooves. Thus, instead of having an oblique bearing upon the member B, the surface of the shoe gradually assumes the shape of a stepped bearing, with the effective frictional surface parallel to the axis of rotation. With the present construction this difficulty is avoided by forming the bearing faces of the shoe substantially parallel to the plane of rotation and to the axis, and by providing a wedge which operates upon the shoe to force the same into frictional contact with the wheel. Such a construction will be just as effectuous at the start as the wedge-shaped shoe, and will also maintain its efficiency unimpaired by the wearing of the parts.

As preferably constructed the shoes C are formed of two separate friction members G and G′, which have stepped surfaces contacting with correspondingly formed surfaces in the wheel B. The surfaces H, H′, H² are parallel to the plane of rotation, while the surfaces I, I′, I² are parallel to the shaft A. Intermediate the members G G′ is a wedge J, this wedge being supported in the bearings D upon the pins K. With such a construction in operation, the reactive force operating through the wedge will be divided into two parts, one forcing the members G G′ against the friction faces H, H′, H², while the other simultaneously forces said members against the cylindrical surfaces I, I′, I². Any change in shape of these surfaces due to wear will still be within the angle formed by the faces H and I, and consequently the force reacting through the wedge will still operate thereupon.

In Fig. 4 a modified construction is illustrated in which the friction members G² and G³ are arranged upon opposite sides of an intermediate rotary member B′ and bear upon the surfaces H³ and H⁴ parallel to the plane of rotation and the surfaces I³ and I⁴ parallel to the axis. The wedge J′ is bifurcated to embrace the members G² and G³ and will react thereon to force them against the surfaces H³, H⁴, I³, I⁴.

In Fig. 5, another modification is illustrated, in which the friction members G⁴, G⁵, have their friction surfaces H⁵ parallel to the surface of the wedge J. With this construction the device will first operate by transmitting the force from the wedge in a direction perpendicular to the surface H⁵, and as the latter through use wears into grooves the force will be divided as in the construction illustrated in Fig. 2.

What I claim as my invention is:

1. The combination of a traveling friction element having stepped friction faces, a coöperating element comprising a shoe having correspondingly stepped faces, and a wedge movable thereon in a direction transverse to that of said traveling element.

2. The combination with a traveling friction element, having opposed stepped friction faces, of a coöperating element comprising a pair of shoes engaging said opposed faces and correspondingly stepped, and a wedge intermediate said shoes.

3. The combination with a rotary friction element having stepped friction faces, of a coöperating element comprising a segmental shoe having a correspondingly stepped face, and a wedge movable radially upon said shoe.

4. The combination with a rotary friction element, having stepped annular friction faces, of a segmental shoe correspondingly stepped and engaging said rotary member, a wedge radially movable on said shoe, and a bearing upon which said wedge is rockably supported.

5. The combination of a traveling friction element, a coöperating element forming in effect a bearing for the first-mentioned element, said coöperating element including a shoe and a wedge, and means for transmitting an actuating force to said traveling element within the angle of friction, said force effecting a relative movement of the wedge and shoe in a direction transverse to the travel of said element, thereby clamping the shoe to the wedge.

6. The combination of a traveling friction element having angularly-arranged friction faces, a coöperating element forming in effect a bearing for the first-mentioned element, said coöperating element including a shoe engaging said faces and a wedge engaging the shoe, and means for transmitting an actuating force to said traveling element within the angle of friction, said force effecting a relative movement of the wedge and shoe in a direction transverse to the travel of said element, thereby pressing the shoe simultaneously against both of said friction faces and clamping the wedge to the shoe.

7. The combination of a traveling friction element having opposed friction faces, a coöperating element forming in effect a bearing for the first-mentioned element, said coöperating element including a pair of shoes for engaging said opposed faces and a wedge engaging the shoes, and means for transmitting an actuating force to said traveling element within the angle of friction, said force effecting a relative movement of the wedge and shoes in a direction transverse to the travel of said element, thereby pressing the shoes in engagement with said opposed faces and clamping the shoes to the wedge.

8. The combination of a traveling friction element having opposed friction faces, a coöperating element forming in effect a bearing for the first-mentionel element, said coöperating element including a pair of shoes for engaging said opposed faces and a wedge arranged intermediate the shoes, and means for transmitting an actuating force to said traveling element within the angle of friction, said force effecting a relative movement of the wedge and shoes in a direction transverse to the travel of said element, thereby pressing the shoes in engagement with said opposed faces and clamping the shoes to the wedge.

9. The combination of a rotating friction member, a coöperating stationary element forming in effect a bearing for the first-mentioned element, said coöperating element including a shoe and a wedge, means for transmitting a force to said rotating friction element without the angle of friction, and means for transmitting a force to said rotating friction element within the angle of friction, said last-mentioned force effecting a relative movement of the wedge and shoe in a direction transverse to the travel of said element, thereby clamping the shoe to the wedge.

10. The combination with a rotating friction element, of a shaft upon which said element is mounted, means for transmitting a force to said shaft without the angle of friction, means for transmitting a force to said shaft within the angle of friction, and a coöperating friction element forming a bearing for the rotating friction element and actuated by a force without the angle of friction, said coöperating friction element including a wedge and a shoe, said force acting upon the shaft within the angle of friction effecting a relative movement of the wedge and shoe in a direction transverse to the axis of rotation of said rotating element, thereby clamping the shoe to the wedge.

11. The combination with a rotating friction element having opposed friction faces, a shaft upon which said element is mounted, means for transmitting a force to said shaft without the angle of friction, means for transmitting a force to said shaft within the angle of friction, a plurality of coöperating friction elements, each comprising a pair of segmental shoes for engaging the opposed faces of said rotating friction element, and a wedge engaging the segmental shoes, said coöperating friction elements forming a bearing for the rotating element when the latter is acted upon by the force without the angle of friction; said force within the angle of friction effecting a relative movement of the wedge and shoes in a direction transverse to the axis of rotation of said element, thereby pressing the shoes in engagement with said opposed friction faces and clamping the wedge to the shoes.

In testimony whereof I affix my signature in presence of two witnesses.

MAXIMILIAN J. L. TOWLER.

Witnesses:
 NELLIE KINSELLA,
 HARRY W. GALVIN.

Copies of this patent may be obtained for five cents each, by addressing the "Commissioner of Patents, Washington, D. C."